S. T. LEWIS.
VARIABLE SPEED GEARING.
APPLICATION FILED FEB. 7, 1908.
909,099.
Patented Jan. 5, 1909.
2 SHEETS—SHEET 1.
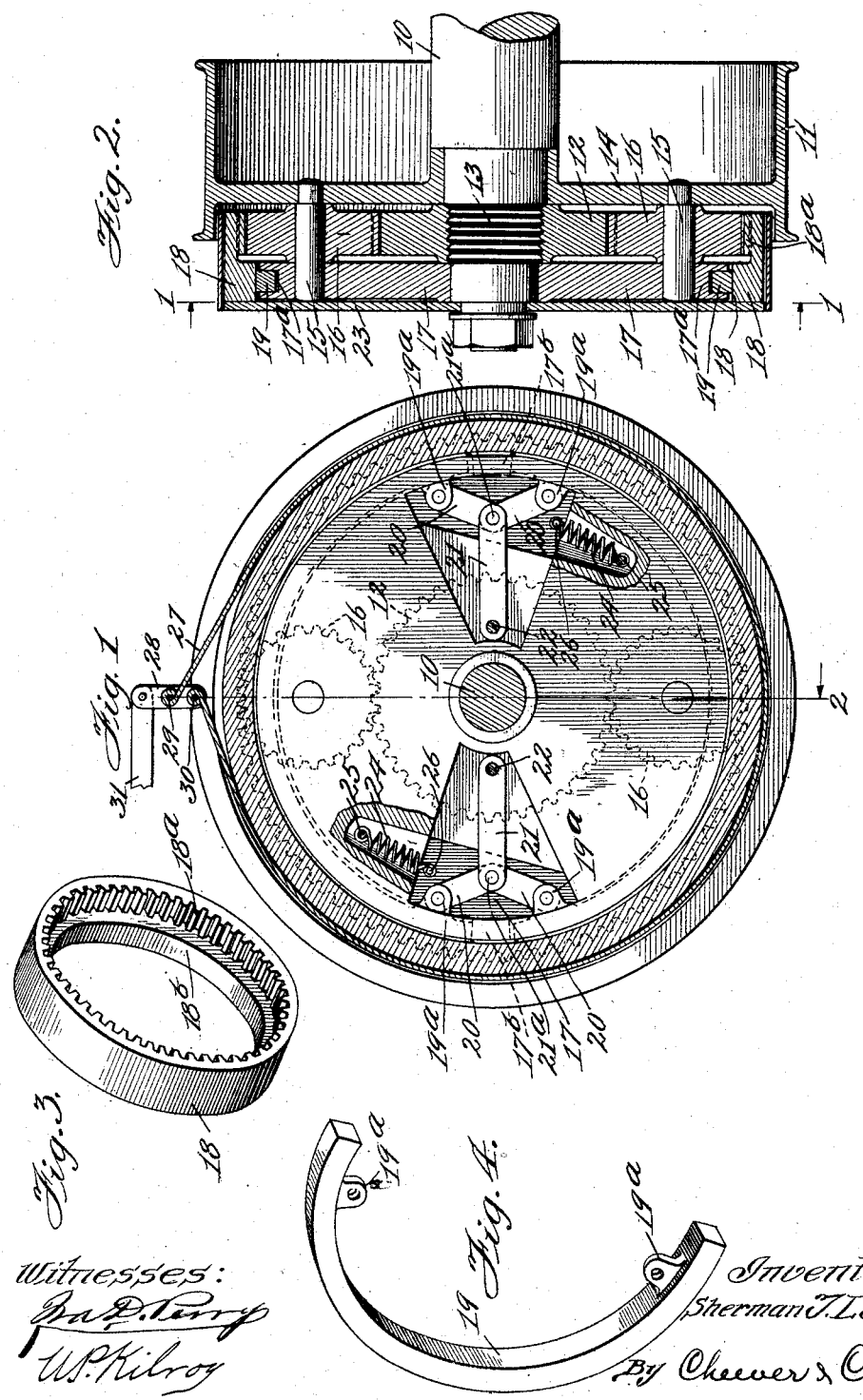
Witnesses:
Inventor:
Sherman T. Lewis
By Cheever & Cox
Attys.

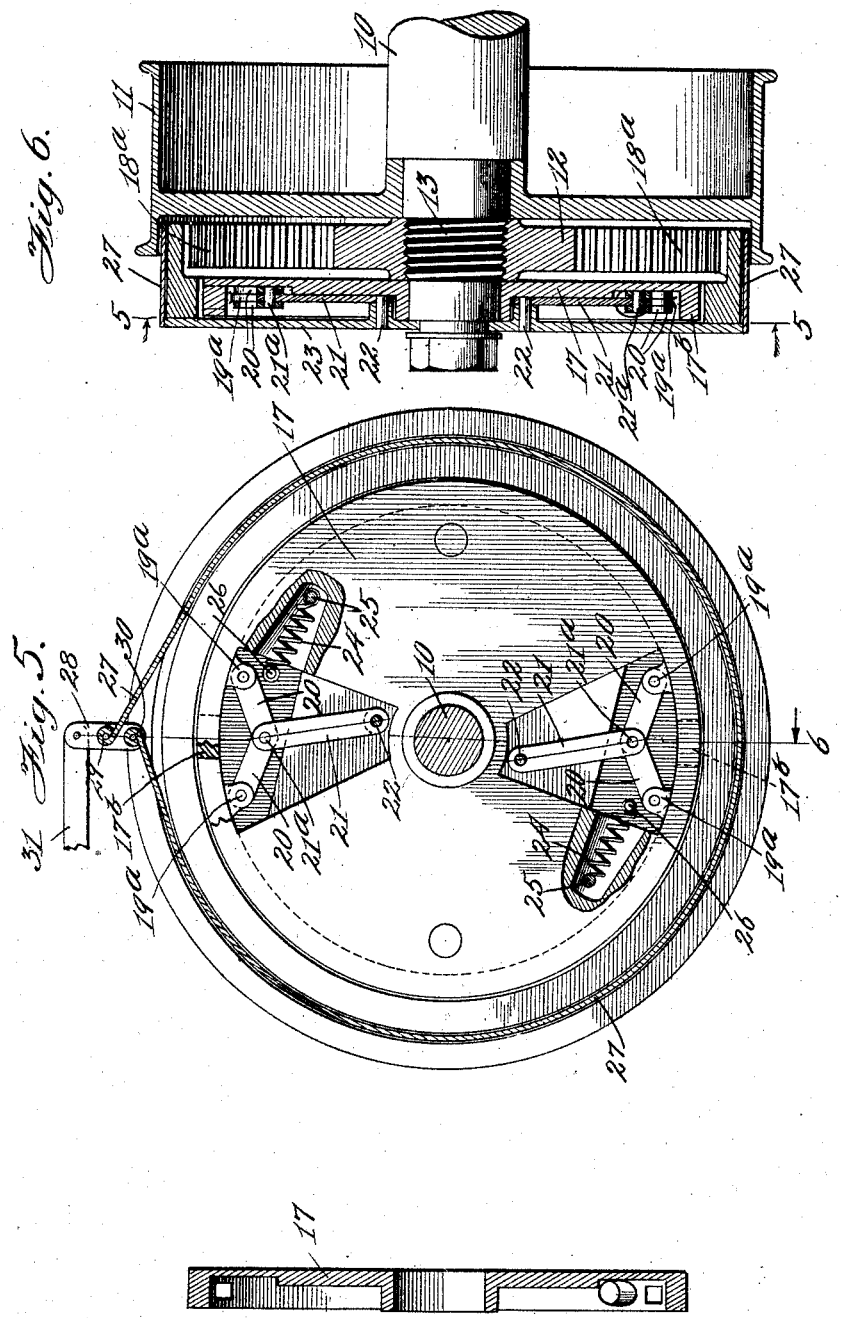

UNITED STATES PATENT OFFICE.

SHERMAN T. LEWIS, OF MILWAUKEE, WISCONSIN, ASSIGNOR OF TWO-THIRDS TO RETTA PIERCE DAVENPORT AND EVERETT C. ROCKWELL, BOTH OF CHICAGO, ILLINOIS.

VARIABLE-SPEED GEARING.

No. 909,099.  Specification of Letters Patent.  Patented Jan. 5, 1909.

Application filed February 7, 1908. Serial No. 414,755.

*To all whom it may concern:*

Be it known that I, SHERMAN T. LEWIS, a citizen of the United States, residing at Milwaukee, in the county of Milwaukee and State of Wisconsin, have invented a certain new and useful Improvement in Variable-Speed Gearing, of which the following is a specification.

My invention relates to variable speed gearing and its object is to provide simple and effective gearing whereby power may be transmitted from a driving to a driven member at various speeds at the will of the operator.

The invention is particularly applicable to motor cycles in which the power shaft is the driving member and a belt pulley or chain drive is the driven member.

For the purpose of illustrating the invention I have shown it embodied in two speed gearing for motor cycles.

Referring to the accompanying drawings: Figure 1 is a sectional elevation taken transversely to the shaft on the line 1—1 Fig. 2. Fig. 2 is an elevation chiefly in section on the line 2—2 Fig. 1. Fig. 3 is a perspective view of the floating ring. Fig. 4 is a perspective view of one of the expansible clutch rings. Fig. 5 is a sectional view taken on the line 5—5 Fig. 6. Fig. 6 is a sectional view taken on the line 6—6 Fig. 5. Fig. 7 is a sectional view of the axle supporting disk.

Similar numerals refer to similar parts throughout the several views.

In the particular form of mechanism selected for illustration, the driving member is a shaft 10 which receives its power from an engine or other driving mechanism. A belt pulley 11 constitutes the driven member and is journaled upon shaft 10. Pulley 11 is rotatable independently of said shaft but is non-shiftable thereon. A driving gear 12 is rigidly secured to the shaft, preferably by means of the screw thread 13. In the web 14 of the pulley are secured pins 15 which serve as axles for intermediate gear wheels 16. Said intermediate wheels are loosely mounted upon said axles so as to rotate independently thereof and remain permanently in mesh with the wheel 12. The axles 15 project through wheels 16 into the disk 17 which consequently always rotates in unison with the pulley 11. Disk 17, like pulley 11, bears upon shaft 10 and is rotatable independently thereof. A floating ring, shown in perspective in Fig. 3, has an internal gear portion 18$^b$ and an internal friction surface 18$^b$. The parts are so arranged that the gear portion 18$^a$ remains in mesh with the intermediate gears 16 and "floats" thereon.

It will be obvious, especially by referring to Fig. 2, that if the shaft 10 be rotated and the floating ring 18 be held stationary, the intermediate gears 16 will roll around upon the internal toothed surface of said floating ring and will cause a movement of the axles 15 and a corresponding movement of the disk 17 and pulley 11. But if said intermediate gears are prevented from rolling upon the said internal toothed surface of the ring, said gears and the ring will rotate in unison about the center of shaft 10, and of course the pulley 11 will rotate in unison with them. The parts then are, practically speaking, all locked together, and I will now describe the means for thus locking them together to cause the pulley to rotate at the same speed as the shaft. Briefly, it is accomplished by causing the floating ring to move in unison with the disk 17 which carries the axles 15.

Disk 17 has two peripheral grooves 17$^a$ which do not meet, but leave two blocks 17$^b$ which serve to drive the clutch rings 19 at the same speed as said disk. Said rings, one of which is shown in perspective in Fig. 4, are loose enough in said grooves to be slightly movable radially so that they may be expanded and contracted as illustrated in Figs. 1 and 5 respectively. These rings are adapted when expanded to bear with enough pressure upon the surface 18$^b$ of the floating ring to cause the rotation thereof at the same speed as disk 17. When said rings are contracted, that is to say, when they are drawn into their grooves 17$^a$ as shown in Fig. 5, they disengage the floating ring 18 to permit it to be held while the disk 17 is rotating. Said rings 19 are expanded and contracted by means of the links 20 which are articulately connected to the lugs 19$^a$ formed on the proximate ends of said rings. Said links 20 are operated by means of the links 21 to which they are articulately connected by the pin 21$^a$. Each link 21 is articulately connected by means of the pin 22 to the disk 23 as best shown in Figs. 5 and 6. By reference to Figs. 1, 5 and 6 it will be obvious that if the pins 21ᵃ be drawn inwardly toward shaft 10, the rings 19 will be contracted and will release the floating ring 18. The pins 21ᵃ may be drawn inward by simply retarding the pins 22 and this is accomplished by retarding the disk 23 in which the pins 22 are fastened. When the disk 17 is rotating and the blocks 17ᵇ are driving said rings, if the disk 23 and pins 22 then be retarded, the links 20 will tend to go ahead while the pins 22 remain behind, and the rings will be drawn inward or contracted, as clearly represented in Fig. 5. Conversely, it is true that the rings 19 will be caused to expand and clutch the inner frictional surface 18ᵇ of the gear 18 by advancing the pins 22 to a radial position as illustrated in Fig. 1. This advancing of pins 22 is accomplished by the springs 24 which are attached at one end to the pins 25 fastened in the disk 23, and at the other end to the pins 26 rigidly secured to the disk 17. It will thus be seen that normally the springs 24 tend to hold the parts 17 and 23 in such position as to maintain the links 21 in radial position with the clutch rings 19 in close frictional contact with the surface 18ᵇ of the floating ring 18 as shown in Figs. 1 and 2. This causes ring 18 to rotate at the same speed as disk 17 and consequently prevents the intermediate gears 16 from rolling upon the interior of said floating ring and consequently causes all the parts to rotate in unison. The gearing is then on high speed, which, owing to the action of the springs 24 is the normal condition.

I will now describe the preferred means for retarding disk 23 to thereby produce the slow speed rotation of the driven pulley 11. A brake band 27 encircles the floating ring 18 and disk 23 and is tightened or released by any suitable operating mechanism, for example, the lever 28 pivoted upon the stationary pin 29 and carrying at its extremity a pin 30 to which one end of the brake band is attached. The other end of the brake band is attached to said fixed pin 29. Lever 28 is operated by suitable means such as rod 31, the arrangement being such that the movement of the rod toward the left (Fig. 5) will tighten the brake band and the movement of said rod toward the right will release it. Upon reference to Fig. 2 it will be noticed that disk 23 is slightly larger in diameter than floating ring 18. The object is to cause the brake band 27 to act upon disk 23 before it does upon ring 18, to retard disk 23 relatively to disk 17. This causes the links 21 and 20 to draw the rings 19 inward to thereby release the ring 18 so that it may be slackened or arrested by the further tightening of the brake band. The first result of a contraction of the brake band, will be to retard the plate 23 and thus release the clutch members. This will free the ring 18, and there being a load on pulley 11, ring 18 will run backward leaving said pulley stationary. Now as the brake band is further contracted and ring 18 is gradually retarded, the pulley will gradually take up a forward speed. When the ring 18 is locked from movement, pulley 11 will rotate at a certain fixed slow speed. When the clutch members 19 are in engagement, the pulley will rotate at fast speed, that is, the speed of the driving shaft. All speeds of pulley 11, obtained by allowing ring 18 to slip, will be intermediate between zero and the said fixed slow speed.

It will be seen that in my gearing under normal conditions springs 24 will hold the links 21 radially so that the expansion rings will contact the floating gear 18 and drive it at the same speed as the shaft 10, thus causing all of the parts to rotate at high speed in unison with the driving shaft 10. By reference to Figs. 1 and 5, it will be seen that in each instance the links 20 form a toggle and the link 21 a pitman for operating them. The result is that a slight movement of the pin 22 forward or back relatively to the disk 17 will produce a very forcible movement of the clutch rings 19. As the result of the toggle action of the links the springs 24 will exert great pressure upon the friction surface 18ᵇ of the ring 18 and there will be little or no danger of slippage. The springs 24 need not be heavy and if the parts are properly adjusted the relative movement of the disks 17 and 23 need be only very slight. As hereinabove pointed out, the disk 17 is secured to and always rotates in unison with the pulley 11. These parts may be secured together in any suitable way.

What I claim as new, and desire to secure by Letters Patent, is:

1. In variable speed gearing, the combination of a driving member, a driven member, a ring concentric with the driving member, gear connections between said driving member and said ring, including an intermediate gear wheel, an axle for said intermediate wheel, an axle supporting member concentric with the driving member and adapted to rotate independently thereof, clutch members rotating always in unison with said axle supporting member and adapted to expand and contract to clutch and release said ring, and means for expanding and contracting said clutch members.

2. In variable speed gearing, the combination of a driving member, a driven member, a ring concentric with the driving member, gear connections between said driving member and said ring, including an intermediate gear wheel, an axle for said intermediate wheel, an axle supporting member concentric with the driving member and adapted to rotate independently thereof, clutch members rotating always in unison with said axle supporting member and adapted to expand and contract to clutch and release said ring, toggles for expanding and contracting said clutch members for clutching and releasing said ring, and means for operating said toggles.

3. In variable speed gearing, the combination of a driving member, a driven member, a ring concentric with the driving member, gear connections between said driving member and said ring, including an intermediate gear wheel, an axle for said intermediate wheel, an axle supporting member concentric with the driving member and adapted to rotate independently thereof, clutch members rotating always in unison with said axle supporting member and adapted to expand and contract to clutch and release said ring, toggles for expanding and contracting said clutch members for clutching and releasing said ring, a pitman for each of said toggles, and means for operating said pitmen.

4. In variable speed gearing, the combination of a driving member, a driven member, a ring concentric with the driving member, gear connections between said driving member and said ring, including an intermediate gear wheel, an axle for said intermediate wheel, an axle supporting member concentric with the driving member and adapted to rotate independently thereof, clutch members rotating always in unison with said axle supporting member and adapted to expand and contract to clutch and release said ring, toggles for expanding and contracting said clutch members for clutching and releasing said ring, pitmen for operating said toggles, a disk concentric with the driving member and adapted to rotate independently thereof, said pitmen being connected to said disk whereby they are operated by retarding or advancing said disk relatively to said axle supporting member, and means for retarding and advancing said disk.

5. In variable speed gearing, the combination of a driving member, a driven member, a ring concentric with the driving member, gear connections between said driving member and said ring, including an intermediate gear wheel, an axle for said intermediate wheel, an axle supporting member concentric with the driving member and adapted to rotate independently thereof, clutch members rotating always in unison with said axle supporting member and adapted to expand and contract to clutch and release said ring, toggles for expanding and contracting said clutch members for clutching and releasing said ring, pitmen for operating said toggles, a disk concentric with the driving member and adapted to rotate independently thereof, said pitmen being connected to said disk whereby they are operated by retarding or advancing said disk relatively to said axle supporting member, springs connecting said disk and axle supporting member for advancing said disk relatively to said axle supporting member, and manually operated means for retarding said disk.

6. In variable speed gearing, the combination of a driving member, a driven member, a ring concentric with the driving member, gear connections between said driving member and said ring, including an intermediate gear wheel, an axle for said intermediate wheel, an axle supporting member concentric with the driving member and adapted to rotate independently thereof, clutch members rotating always in unison with said axle supporting member and adapted to expand and contract to clutch and release said ring, toggles for expanding and contracting said clutch members for clutching and releasing said ring, pitmen for operating said toggles, a disk concentric with the driving member and adapted to rotate independently thereof, said pitmen being connected to said disk whereby they are operated by retarding or advancing said disk relatively to said axle supporting member, springs connecting said disk and axle supporting member for advancing said disk relatively to said axle supporting member, and a brake band for retarding said disk.

7. In variable speed gearing, the combination of a driving member, a driven member, a ring concentric with the driving member, gear connections between said driving member and said ring, including an intermediate gear wheel, an axle for said intermediate wheel, an axle supporting member concentric with the driving member and adapted to rotate independently thereof, clutch members rotating always in unison with said axle supporting member and adapted to expand and contract to clutch and release said ring, toggles for expanding and contracting said clutch members for clutching and releasing said ring, pitmen for operating said toggles, a disk concentric with the driving member and adapted to rotate independently thereof, said pitmen being connected to said disk whereby they are operated by retarding or advancing said disk relatively to said axle supporting member, springs connecting said disk and axle supporting member for advancing said disk relatively to said axle supporting member, and a brake band for retarding said disk, said brake band being adapted also to retard said ring.

In witness whereof, I have hereunto subscribed my name in the presence of two witnesses.

SHERMAN T. LEWIS.

Witnesses:
K. SHAWVAN,
MAUDE D. WEISS.